United States Patent [19]
Tiedge et al.

[11] Patent Number: 5,800,002
[45] Date of Patent: Sep. 1, 1998

[54] SYSTEM FOR PROVIDING ADJUSTABLE OCCUPANT SPACE IN A VEHICLE

[76] Inventors: Robert Tiedge, 5501 N. Oxford, Indianapolis, Ind. 46220-0223; Michael Anderson, 5300 Silver Caynon Rd., Apartment G, Yorba Linda, Calif. 92687

[21] Appl. No.: 584,060

[22] Filed: Jan. 11, 1996

[51] Int. Cl.[6] .................................................. B62C 1/06
[52] U.S. Cl. ................................................ 296/26; 296/171
[58] Field of Search ............................. 296/26, 156, 164, 296/165, 171, 172, 173, 175, 176; 52/67; 403/316, 318, 319, 324, 376, 378

[56] References Cited

U.S. PATENT DOCUMENTS

| | | |
|---|---|---|
| 2,757,418 | 8/1956 | Bergstrom . |
| 2,886,856 | 5/1959 | Che . |
| 2,898,143 | 8/1959 | Ferrera . |
| 2,906,556 | 9/1959 | Cantele et al. . |
| 3,157,427 | 11/1964 | Reynolds . |
| 3,300,914 | 1/1967 | Stewart et al. . |
| 3,740,088 | 6/1973 | Ratcliff . |
| 3,924,889 | 12/1975 | Gogush . |
| 3,931,895 | 1/1976 | Grimaldo . |
| 4,128,269 | 12/1978 | Stewart . |
| 4,488,752 | 12/1984 | Broussard . |
| 4,500,132 | 2/1985 | Yoder . |
| 4,943,106 | 7/1990 | Hunt . |
| 4,960,299 | 10/1990 | Steadman . |
| 5,295,430 | 3/1994 | Dewald, Jr. et al. . |
| 5,586,802 | 12/1996 | Dewald, Jr. et al. ............... 296/26 |

*Primary Examiner*—Stephen Avila
*Attorney, Agent, or Firm*—Woodward Emhardt Naughton Moriarty & McNett

[57] ABSTRACT

A system for varying space of a vehicle having a fixed portion with occupiable space and a number of ground engaging wheels coupled to the fixed portion. An expandable portion is coupled to the fixed portion and has a rigid floor. The expandable portion is movable relative to the fixed portion to adjust volume of a living space defined by the fixed and expandable portions. The floor is configured for planar movement along a generally horizontal plane when the expandable portion is moved. The system has a first load bearing arm engaging the floor to support the expandable portion. The first load bearing arm is pivotally anchored to the fixed portion to rotate about a generally vertical first axis to correspondingly move the expandable portion. Also, the system has an operator controlled actuator coupled to the first load bearing arm to selectively rotate the first load bearing arm and thereby control position of the expandable portion relative to the fixed portion to provide adjustment of the living space. The system may also include multiple swing arms controllably linked by a rod to facilitate tandem rotation.

34 Claims, 11 Drawing Sheets

SYSTEM FOR PROVIDING ADJUSTABLE OCCUPANT SPACE IN A VEHICLE

BACKGROUND OF THE INVENTION

The present invention relates to a system for variably sizing a living space, and more particularly a reconfigurable living space system for a vehicle.

Recreational vehicles enjoy widespread popularity because they enable their owners to travel away from home for extended periods while enjoying many of the comforts of home. One persistent limitation of such vehicles is that their interior spaces are somewhat small and cramped compared to a normal living space. While many factors contribute to this design limitation, a major contributor is the relatively narrow width of the normal street or highway. The need to travel within the confines of a normal highway traffic lane sets an upper limit on the feasible width of a recreational vehicle. Because this upper width limit is much smaller than the width of even a small room in a normal house, the interior of a typical recreational vehicle seems cramped by familiar comparison.

One ingenious solution to this problem is the incorporation of an expandable room into a recreational vehicle such as a motor home or a trailer. This feature has found application in other types of trailers and vehicles having occupiable space.

U.S. Pat. No. 4,960,299 to Steadman shows a trailer with an expandable living space provided, in part, by folding walls which pivot to a position against the side of the trailer when not in an expanded configuration. U.S. Pat. No. 2,898,143 to Ferrera shows a trailer with movable telescoping walls and a foldable floor which combine to provide an expandable living space. U.S. Pat. No. 2,906,556 to Cantele et al. also shows an expandable trailer with a folding floor. This existing system uses pivoting walls to expand the sides and a telescoping wall in the rear. Unfortunately, the folding walls and floors of these systems complicate the expansion process. Necessarily, these designs do not permit one to continuously occupy the expandable section of the vehicle in both the expanded and unexpanded positions.

Consequently, slide out rooms have been developed which are continuously occupiable in both the expanded and unexpanded positions. Quite often, these rooms are configured to emerge along an outer side wall of the vehicle when expanded. U.S. Pat. No. 5,295,430 to Dewald, Jr., et al. discusses slide out rooms and discloses a number of telescoping tubular supports connected to the underside of the vehicle to laterally move the slide out room between the expanded and unexpanded positions. These supports also must be configured to bear the load of the room in the expanded position. Ideally, such load bearing function is performed without the need for ground engaging supports other than those required for the vehicle in the unexpanded position. One drawback with telescoping tubular support systems is the unacceptable frequency of binding between the slide out room and the fixed portion of the vehicle during movement. Typically, such binding results when relative movement between multiple supports is not properly synchronized. One existing system addresses this problem by adding a number of pulleys and cables to control motion of one telescoping support relative to another. Unfortunately, such systems generally increase complexity and expense.

Another drawback of telescoping tube support systems is that mounting of the supports generally requires significant gaps or voids in the vehicle chassis or frame—compromising structural integrity. For systems using a vehicle powered actuator to accomplish expansion, the threat of binding often limits the speed with which the telescoping members may be moved, which in turn presents a significant drain on the vehicle electrical system. Also, these systems often add significant weight to the vehicle. Thus, there is a need for a system to move and support expandable portions of a vehicle that resists binding without increasing complexity. This system should be lighter, faster, and more power efficient than existing systems.

Another problem facing vehicle expansion systems is the need to provide a latch or lock mechanism to assure the position of an expanded portion relative to a fixed portion cannot be moved—even in the event of power failure or a failure of the means provided to move the expandable portion. Existing safety latches often require alignment of a hole passing though a surface of the fixed portion with a hole passing through the surface of the expanding portion. A pin is then inserted through the aligned holes to accomplish latching. Such a locking arrangement, however, presents several problems in practice. First, it is difficult to align the two holes during movement of the expandable portion. If the holes are not properly aligned, the pin cannot be inserted therethrough. Furthermore, vehicle members have a tendency to warp over time, contributing to the difficulty of aligning the holes.

One attempt to solve this problem involves making one of the holes larger than the other—thereby eliminating the need for exact alignment. However, drilling a larger hole can be unsightly and may compromise structural integrity. A further problem arises in that the holes may deform over time when a significant force is applied to the pin. Therefore, there remains a need for a device that will lock one surface relative to the other without relying on the aligment of holes in each surface to be coupled.

SUMMARY OF THE INVENTION

One aspect of the present invention is a system for varying space in a vehicle which includes a fixed portion with occupiable space and a number of ground engaging wheels, and an expandable portion coupled to the fixed portion. The expandable portion has a rigid floor and is movable relative to the fixed portion to adjust volume of a living space defined by the fixed and expandable portions. The floor is configured for planar movement along a generally horizontal plane when the expandable portion is moved.

The system also includes a first load bearing arm engaging the floor to support the expandable portion. The first load bearing arm is pivotally anchored to the fixed portion to rotate about a generally vertical first axis to correspondingly move the expandable portion. An operator controlled actuator is coupled to the first load bearing arm to selectively rotate the first load bearing arm and thereby control position of the expandable portion relative to the fixed portion to provide adjustment of the living space.

Another apsect of the present invention is a system that has a telescoping section at least partially nested within a fixed section and the telescoping section is movable relative to the fixed section along a first axis to vary volume of a living space defined by the fixed and telescoping sections. The system also includes a first load bearing arm to support and position the telescoping section relative to the fixed section. The load bearing arm has an anchor portion pivotally anchored to the fixed portion, said first load bearing arm being configured to rotate about a second axis generally perpendicular to the first axis. The load bearing arm also has a bearing portion opposite the anchor portion and rigidly connected thereto. The bearing portion engages the telescoping section to supportably move the telescoping section as the first load bearing arm rotates. An operator controlled actuator is coupled to the first load bearing arm to selectively rotate the first load bearing arm about the second axis and thereby control position of the telescoping section relative to the fixed section.

The present invention also includes a vehicle for providing adjustable occupant space which has a ground engaging fixed section and an expandable section movable relative to the fixed section to vary volume of a living space. The vehicle has a carriage for supporting and moving the expandable section relative to the fixed section. The carriage includes at least a pair of load bearing arms, each having a first portion pivotally attached to the fixed section so that each of the arms can rotate about a generally vertical axis. The carriage also has a second portion opposite the first portion and engaging the expandable section. Furthermore, the carriage has a rod movably coupled to the first portion of each of the pair of arms and spanning a distance therebetween. The rod is configured to rotate the pair of arms in tandem. In addition the vehicle has an operator controlled actuator coupled to the carriage. The actuator selectively rotates the pair of arms to control position of the expandable section relative to the fixed section and thereby adjust the living space.

A further feature of the present invention is a reconfigurable housing system that includes an occupiable enclosure with a first wall and a second wall. The first and second walls are movable one relative to the other along a plane to adjustably configure the occupiable enclosure. A first pair of guide rails are fixed to the first wall, each of the pair of guide rails opposing the other and defining a channel therebetween. One of the pair of guide rails defines a first notch intersecting the channel. The system includes a projection extending from the second wall. The projection has a side surface defining a second notch and is configured to move into the channel between said pair of guide rails to align the first and second notches to form a first cavity. One of said first and second walls defines an aperture configured to align with the first cavity. A coupling pin is configured to controllably engage the first cavity through the aperture. The coupling pin has a first side opposing a second side. The first side contacts the projection and the second side contacts the guide rail defining the first notch. When so engaged, the coupling pin substantially prevents movement of the projection relative to the first pair of guide rails—thereby substantially preventing movement of the first wall relative to the second wall.

An additional feature of the present invention is an adjustable occupiable space system having an enclosure with a first surface and a second surface which are movable one relative to the other to adjust size of a living space. A finger is defined by the first surface which has a side defining a first notch therein. A first channel and a second notch are defined by the second surface. The channel slideably receives the finger to align the first notch with the second notch to form a first cavity. A coupling pin selectively moves to controllably engage the first cavity. The pin prevents substantial movement of the first and second surfaces relative to each other when so engaged without passing through the finger or the second surface.

Still another feature is a system for adjustably sizing occupiable space of a vehicle that includes an occupiable fixed portion with a support surface and a number of ground engaging wheels and an expandable portion telescopically movable relative to the fixed portion along an axis to vary volume of a living space defined by the fixed and expandable portions. The expandable portion has a slidable floor and one of the support surface and slidable floor defines a first guide slot and the other includes a first guide rail slidingly engaging the first guide slot. The first guide slot and the first guide rail are generally parallel to the axis to guide movement of the expandable portion therealong. At least one of the first guide slot and the first guide rail includes a self-lubricating polymeric resin material—such as nylon.

One object of the present invention is to provide a swing arm carriage for supporting and moving the expandable section of a vehicle.

Another object is to reduce binding, increase adjustment speed, and improve efficiency of a system for adjusting the volume of a living space that has fixed and expandable portions.

Still another object of the present invention is to provide a latching mechanism which does not require alignment of a hole to interlock the expandable portion and fixed portion of an expandable vehicle in a selected position.

Further objects and features of the present invention will be made apparent from the drawings and description contained herein.

DESCRIPTION OF THE PREFERRED EMBODIMENT

Figure 1:
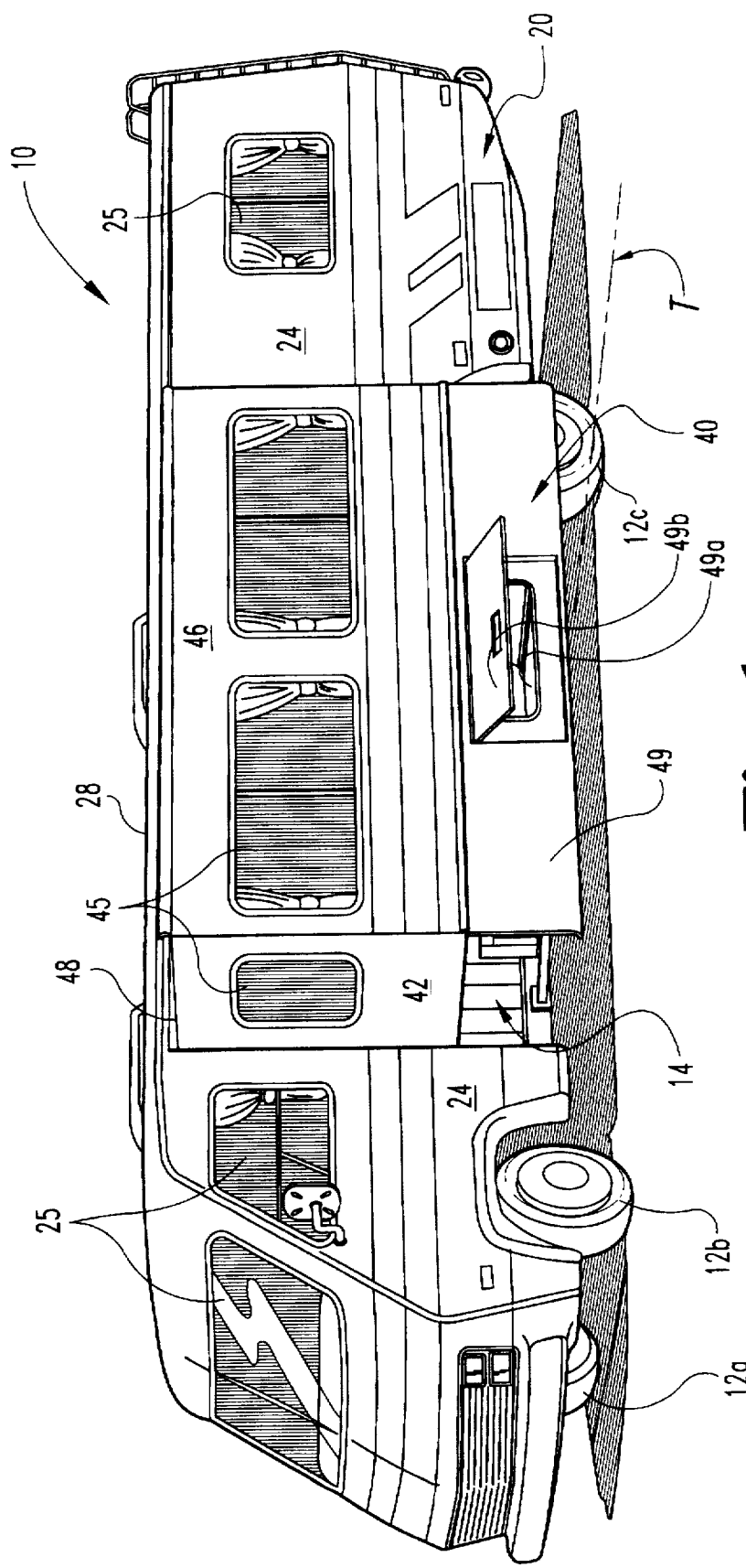
FIG. 1 is perspective view of a vehicle of one preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

Figure 2:
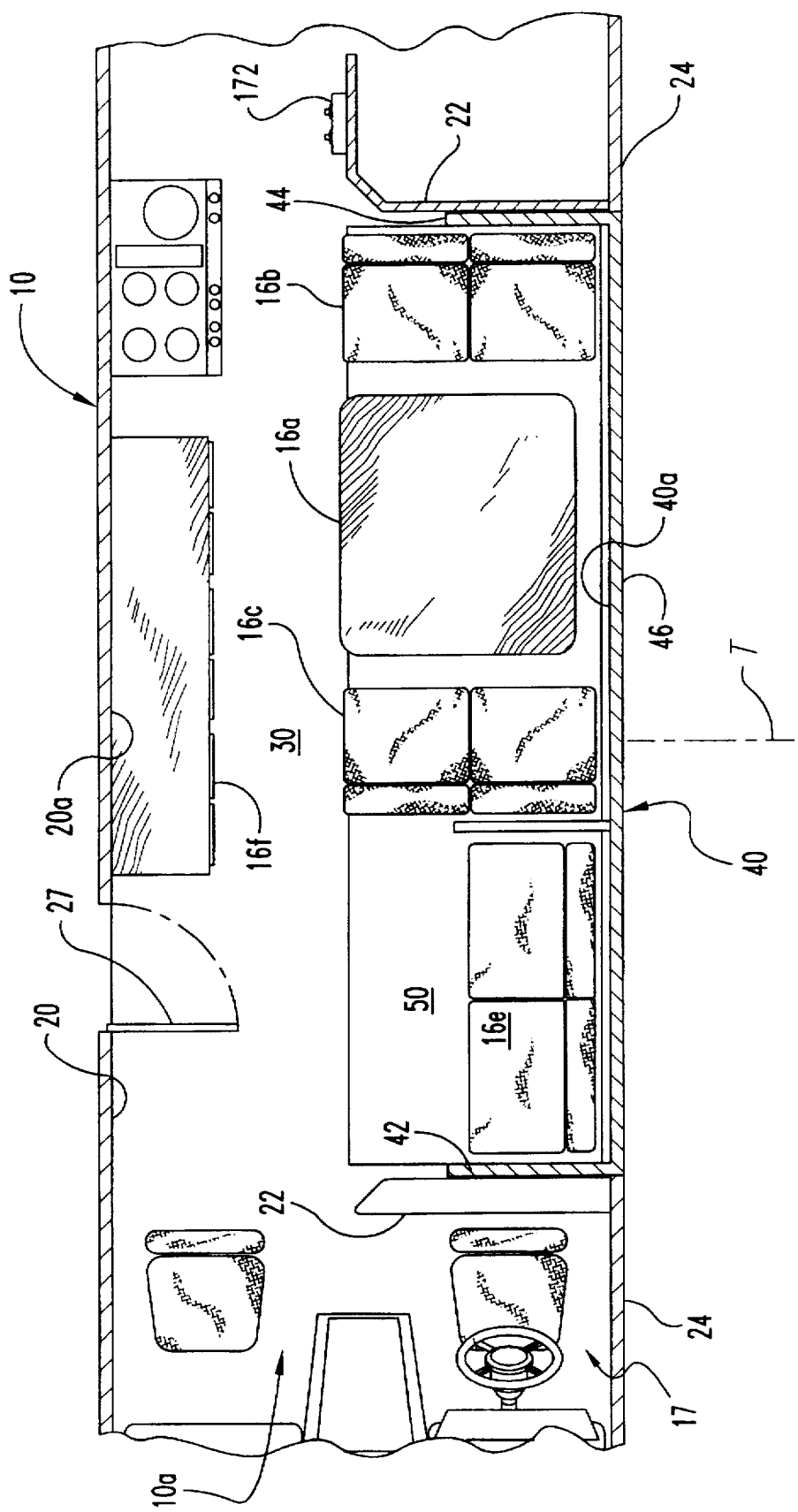
FIG. 2 is a diagrammatic partial cross-sectional view of the vehicle shown in FIG. 1.

FIGS. 1 and 2 depict vehicle 10 of one preferred embodiment of the present invention. Vehicle 10 has a number of ground engaging wheels 12a, 12b, 12c; a fixed section 20; and an expandable section 40. Vehicle 10 also includes a compartment 14 for housing a means to move and support expandable section 40 relative to fixed section 20. Fixed section 20 includes internal walls 22 and external wall 24. Fixed section 20 further includes roof 28 and floor 30 generally opposing one another. Collectively, the structures of fixed section 20 define a fixed section living space 20a.

Expandable section 40 includes opposing walls 42, 44 and outer wall 46. Opposing walls 42, 44 and outer wall 46 are joined to roof 48. Roof 48 opposes floor 50. Floor 50 is correspondingly joined to opposing walls 42, 44 and outer wall 46. Opposing wall 42 includes a window 45. Outer wall 46 includes a window 45 and a skirt portion 49. Skirt portion 49 has a storage compartment or bin 49a for the storage of miscellaneous items. Bin 49a has an access door 49b for access from the exterior or outside of vehicle 10. Expandable section 40 defines an occupiable living space 40a.

Vehicle 10 defines an interior living space 10a comprising fixed section living space 20a and expandable section living space 40a. Vehicle 10 has windows 25 and door 27 and includes furnishing 16a, 16b, 16c, 16e, and 16f configured in the conventional manner for a motor home. Vehicle 10 is also motorized in the conventional manner and includes driving compartment 17 configured in a way common to motor homes and the like.

Expandable section 40 is configured to move relative to fixed section 20 along an axis T. This movement facilitates selective adjustment of expandable section 40 between the expanded postion shown in FIG. 1 and the unexpanded postion shown in FIG. 2. In the unexpanded position, outer wall 46 is generally flush with external wall 24. Unlike many existing systems, the expandable section 40 may be occupied in the unexpanded as well as expanded positions. Similarly, the fixed section 20 is occupiable whether the expandable section 40 is expanded or unexpanded.

Figure 3:
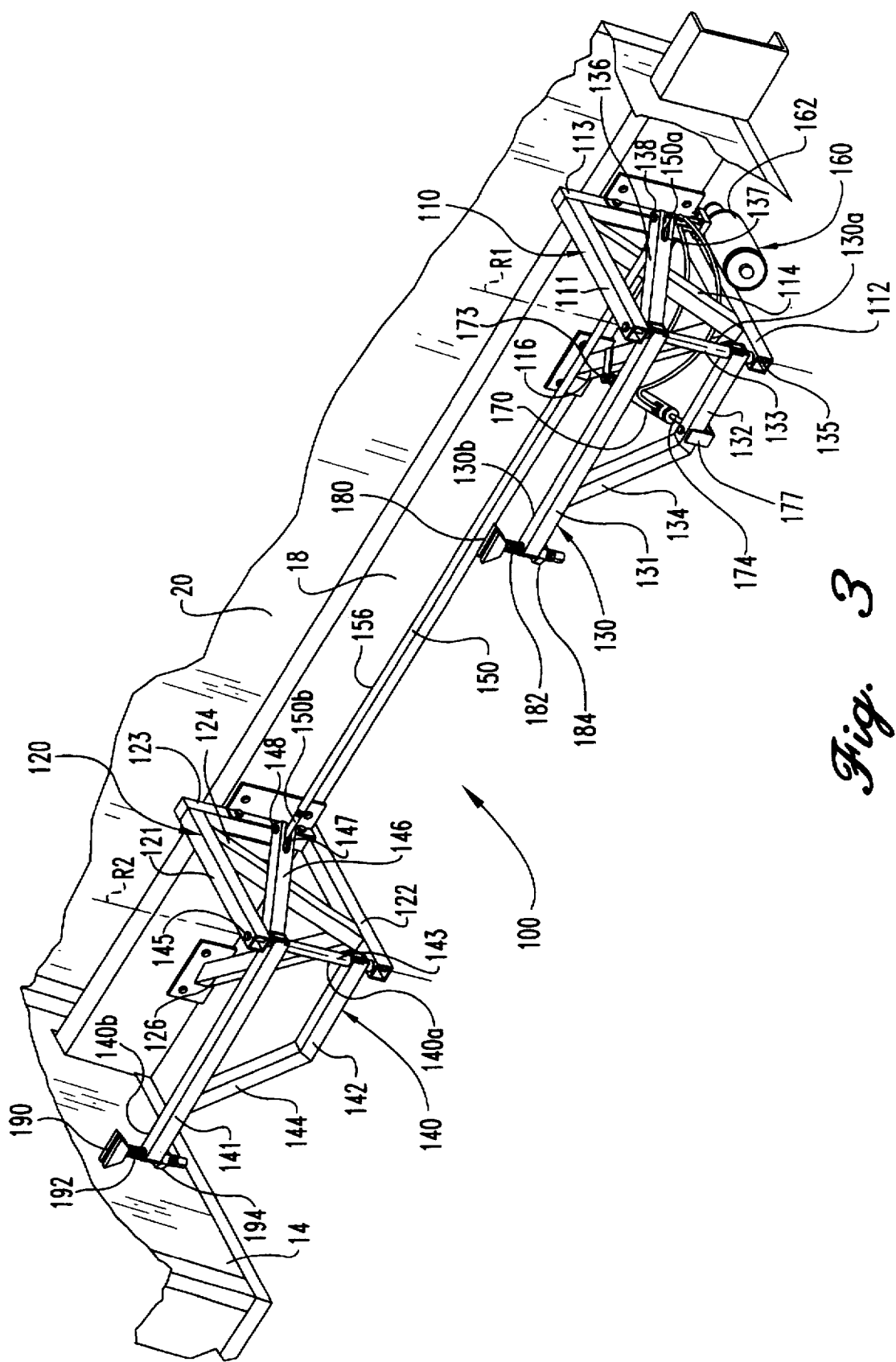
FIG. 3 is a partial side perspective view of a carriage for the preferred embodiment of FIG. 1.
Figure 4:
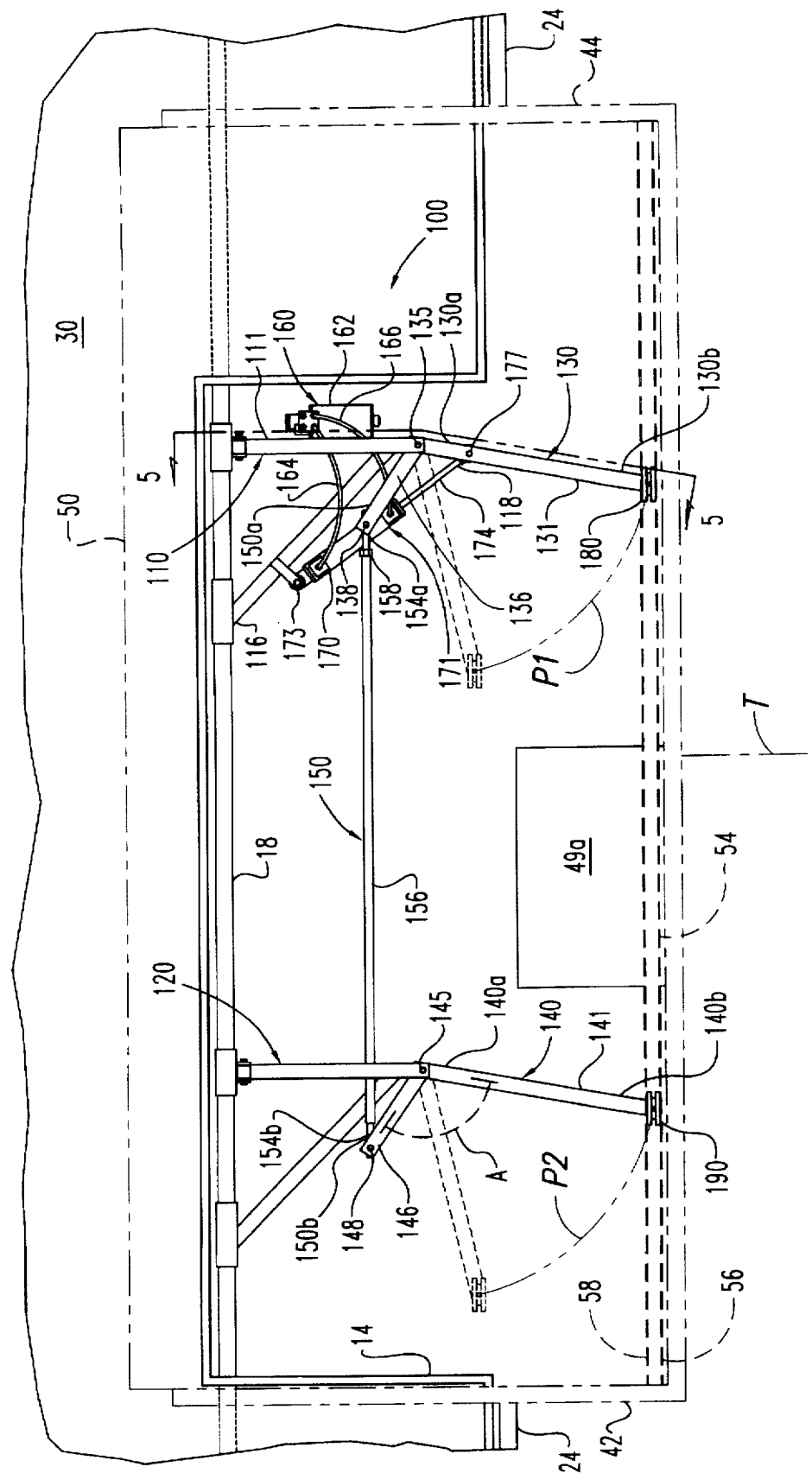
FIG. 4 is a top plan view of the carriage shown in FIG. 3.
Figure 5:
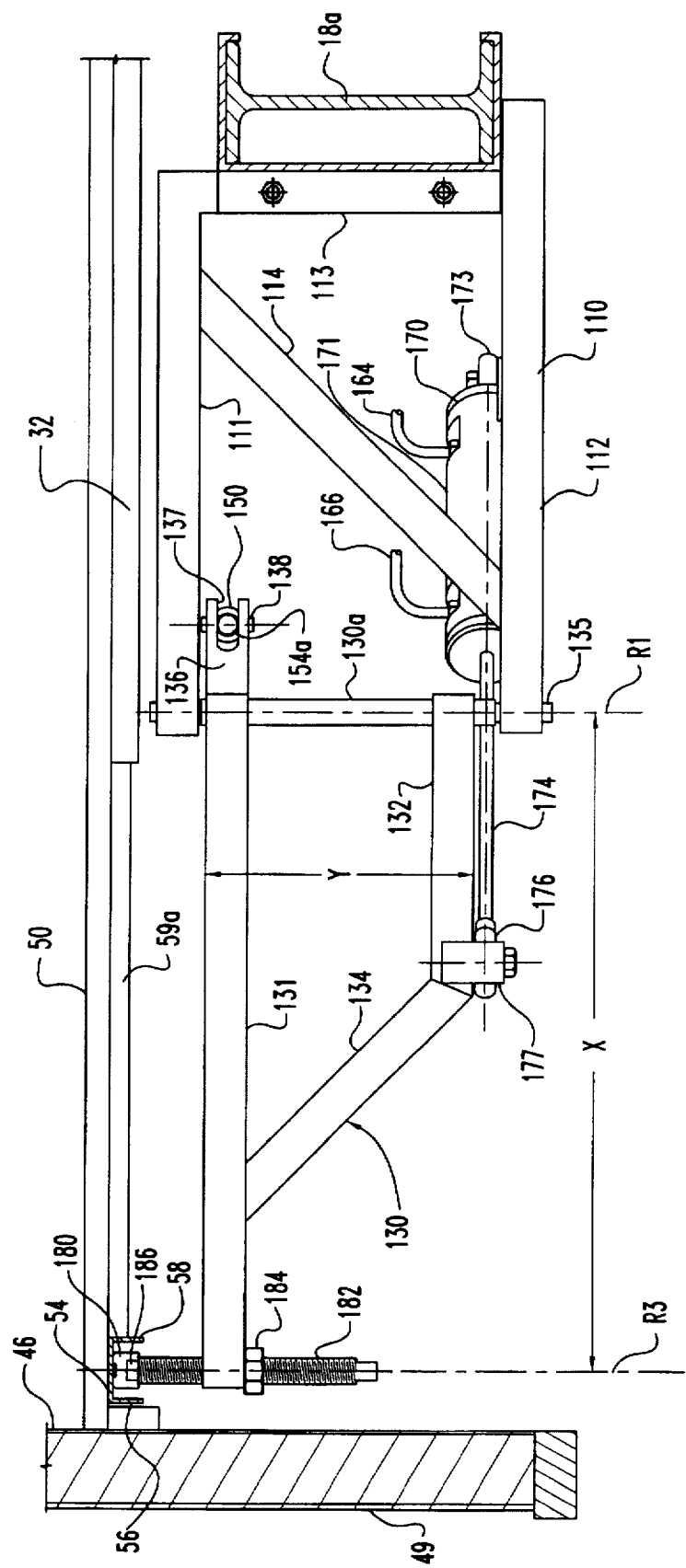
FIG. 5 is a partial cross-sectional view of the carriage shown in FIGS. 3 and 4 taken along section line 5—5 of FIG. 4.

FIGS. 3–5 illustrate a carriage 100 for moving and supporting expandable section 40 relative to fixed section 20. Expandable section 40 is not shown for clarity in FIG. 3. Similarly, expandable section 40 is only shown partially in FIGS. 4 and 5. Carriage 100 includes anchor brackets 110, 120 rigidly attached to fixed section 20 of vehicle 10. In FIGS. 3 and 4, brackets 110, 120 are attached to a C-shaped vehicle frame member 18. In FIG. 5, bracket 110 is shown attached to an I-shaped vehicle frame member 18a. In either case, bolted attachment plates are illustrated as the means of rigid attachment. Alternatively, welding or some other conventional attachment means may be used.

Notably, neither bracket 110, 120 passes through the vehicle frame and thereby avoids significantly compromising structural integrity of the vehicle chassis. Each bracket 110, 120 has a generally horizontal top member 111, 121 and a bottom member 112, 122 joined by generally vertical members 113, 123 and gusset members 114, 124. Each bracket 110, 120 also includes angle brace 116, 126. Brackets 110, 120 are each coupled to frame 18 along vertical member 113, 123 and with angle brace 116, 126. As more clearly seen in FIG. 5, bottom members 112, 122 have a portion which extends under frame 18 or 18a to provide better load bearing support.

Load bearing arms 130, 140 are pivotably anchored to brackets 110, 120, and correspondingly pivotally connected or attached to fixed portion 20 of vehicle 10. Each arm 130, 140 has an anchor portion 130a, 140a opposing a bearing portion 130b, 140b. Anchor portions 130a, 140a and bearing portions 130b, 140b are integrally and rigidly connected to each other. Arms 130, 140 include generally horizontal elongated top members 131, 141 and support members 132, 142 connected by gusset 134, 144. Generally, vertical tubes 133, 143 are positioned between top members 131, 141 and support members 132, 142 and slightly protrude through a bore in each. For each arm 130, 140, a corresponding bearing pin 135, 145 passes through top member 131, 141; tube 133, 143; and support member 132, 142. Each bearing pin 135, 145 is fastened to a bracket 110, 120, respectively.

Bearing pins 135, 145 each lie along a generally vertical rotational axis R1, R2. Arms 130, 140; tubes 133, 143; and bearing pins 135, 145 are configured so that each arm 130, 140 rotates about axis R1, R2, respectively.

Arms 130, 140 are also each configured to include an oblique portion 136, 146. Oblique portion 136, 146 is positioned along an oblique angle with respect to a longitudinal axis along top members 131, 141. Oblique angle A is illustrated in FIG. 4 for arm 140. Preferably this angle is in a range of about 100 to 130 degrees. More preferably, the angle is in a range of about 110 to 120 degrees. Most preferably, the angle is about 115 degrees.

Rod 150 is pivotally connected to each oblique portion 136, 146. Each oblique portion 136, 146 defines a cavity 137, 147 configured to form a clevis connection in conjunction with pins 138, 148 to pivotally connect to opposing ends 150a, 150b of rod 150. When so connected, rod 150 spans a distance between arms 130, 140 and pivotably couples arms 130, 140 together. Rod 150 further includes opposing mounting sections 154a, 154b corresponding to each end 150a, 150b. Also, rod 150 has an elongated turnbuckle segment 156 threadingly engaging each mounting section 154a, 154b. Mounting segments 154a, 154b and turnbuckle segment 156 are configured so that rotation turnbuckle segment 156 about its longitudinal axis provides a turnbuckle function to adjust the effective length of rod 150. In turn, this adjustment controls the relative spacing of arms 130, 140 coupled to rod 150. Stopping nut 158 threadingly engages mounting segment 158a of rod 150 at the interface with turnbuckle segment 156 to prevent unwanted rotation of turnbuckle segment 156 once adjustment has been accomplished. Stopping nut 158 may be turned about mounting segment 154a relative to turnbuckle segment 156 to allow readjustment as needed.

In one preferred embodiment, each bracket 110, 120 and arm 130, 140 is manufactured from metal tubes using conventional joining methods. In other embodiments, different shapes or materials may be used as would occur to one skilled in the art.

Next, actuation system 160 for carriage 100 is discussed. Actuation system 160 includes an operator contolled hydraulic pump 162 coupled to a double acting hydraulic cylinder 170. Both pump 162 and cylinder 170 are of a conventional type. Coupling between the pump 162 and hydraulic cylinder 170 is accomplished by fluid conduits 164, 166. Pump 162 may also service other actuation systems for vehicle 10. Hydraulic cylinder 170 includes a body 171 and a mounting ear 172 pivotably mounted to angle brace 116 by fastener 173. Hydraulic cylinder also has a plunger 174 with a mounting portion 176 pivotably mounted to support member 132 by fastener 177.

Each arm 130, 140 includes a slide block 180, 190 on a spindle 182, 192 threadingly engaging a threaded bore in each bearing portion 130b, 140b. The height of each slide block 180, 190 is adjusted relative to arm 130, 140 by turning spindle 182, 192 to advance it up or down with respect to bearing portion 130b, 140b, and locking spindle 182, 192 in place with stopper nut 184, 194. As illustrated in FIG. 5, spindle 182 has an end 186 that is preferably not threaded which engages a recess in each slide block 180. It being understood that spindle 192 and slide block 190 are similarly configured (not shown). Each slide block rests on spindle 182, 192 to pivot about an axis along the length of each spindle 182, 192. This rotational axis for spindle 182 is shown as axis R3 in FIG. 5.

Figure 7:
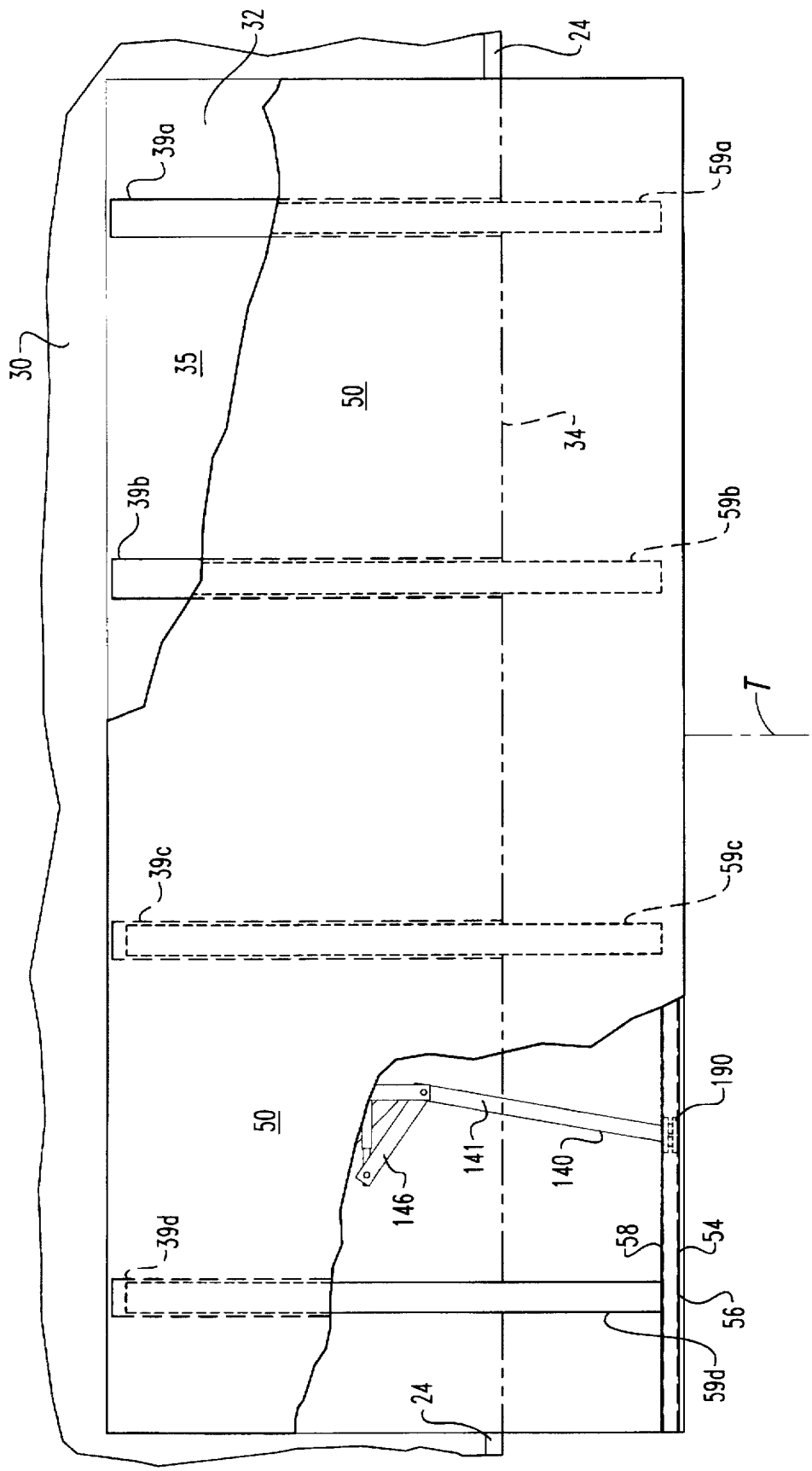
FIG. 7 is a cut away top plan view of a slideable floor system for the preferred embodiment of FIG. 1.

FIGS. 4, 5, and 7 depict the relationship of floor 30 of fixed section 20 with floor 50 of expandable section 40. Notably floor 30 is underneath floor 50 and floor 50 is configured to slide along floor 30 when expandable section 40 is adjusted between expanded and unexpanded positions. Floor 50 is rigid and planar and generally moves along a horizontal plane. Also, floor 50 includes a guide slot 54 along the outer wall 46 of expandable section 40. Slot 54 is situated between outer side 56 and inner side 58. Generally, slot 54 is oriented along a horizontal axis perpendicular to the R1, R2, R3, and T axes. Each slide block 180, 190 engages slot 54 and is configured to slide therealong. The height of floor 50 relative to floor 30 and carriage 100 may be varied by adjusting the position of spindles 182, 192 in bearing portions 130b, 140b.

Having described the structure of carriage 100, the operation of carriage 100 and its application in vehicle 10 is next discussed. FIG. 3 shows carriage 100 in a retracted position corresponding to an unexpanded position of expandable section 40. FIG. 4 shows carriage 100 in an extended position corresponding the the expanded position of expandable section 40. FIG. 4 depicts arcuate paths P1 and P2 of arms 130, 140 when rotated about R1, R2, respectively. Also, the retracted position of arms 130, 140 are shown in FIG. 4 in phantom.

With carriage 100 starting in a retracted position, plunger 174 is at a minimal length being mostly nested within body 171 of hydraulic cylinder 170. To rotate arms 130, 140 and correspondingly move expandable section 40 relative to fixed section 20, pressurized hydraulic fluid is sent by controllable hydraulic pump 162 through conduit 164 to push a piston attached to plunger 174 inside body 171 (not shown). Plunger 174 is correspondingly pushed out of hydraulic cylinder 170 and pushed against arm 130 via mounting portion 176. Arm 130 correspondingly pivots in relation to hydraulic cylinder 170 and also swings outward away from vehicle 10 along path P1—rotating about axis R1.

As arm 130 rotates outward, oblique portion 136 correspondingly rotates to push rod 150. Rod 150 correspondingly pushes oblique portion 146 of arm 140 and causes arm 140 to rotate outward along with arm 130. In this manner, the pivotable linkage of rod 150 between arms 130 and 140 provides for the tandem rotation of arms 130, 140 upon rotation of either arm by an actuator such as hydraulic cylinder 170. The tandem rotation of arms 130, 140 correspondingly moves slide blocks 180, 190 along slot 54, and slide blocks 180, 190 push outward against outer side 56 to correspondingly move floor 50 laterally outward from fixed section 20. Floor 50 generally slides on floor 30 along a horizontal plane. Because floor 50 is coupled to expandable section 40, expandable section 40 moves outward with rotation of arms 130, 140. Extension of carriage 100 and the corresponding expanded position of expandable section 40 is illustrated in FIGS. 1, 4, and 5.

Retraction of carriage 100 is accomplished by configuring hydraulic pump 162 to send pressurized fluid through conduit 166 to correspondingly retract plunger 174 into body 171 of double acting hydraulic cylinder 170. Correspondingly, plunger 174 pulls against arm 130 which causes rotation of arm 130, and also arm 140 through the pivotal connection of rod 150 to oblique portions 136, 146.

During retraction, slide blocks 180, 190 slide in slot 54 in a direction opposite the direction traveled during extension. Correspondinly, during retraction, slide blocks 180, 190 pull against inner side 58 to pull floor 50 of expandable section 40 inward. Likewise expandable section 40, joined to floor 50, is correspondingly pulled inward toward vehicle 10. FIGS. 2 and 3 show carriage 100 in the retracted position.

Not only do arms 130 and 140 provide for controlled movement of expandable section 140, but also bear the load of expandable section 40 in the expanded position without the need for additional ground engaging supports. Generally, the load bearing arm structure of carriage 100 is lighter weight and takes up less space relative to conventional telescoping tube supports. In part, this efficiency is related to the cantilever configuration of arms 130 and 140. As shown for arm 130 in FIG. 5, arm 130 has a distance Y which corresponds to the hinge length of the pivoting anchor attachment of anchor portion 130a to bracket 110 along axis R1. Arm 130 also has a support length X generally perpendicular to axis R1 as shown in FIG. 5. In part, the load bearing capability of arm 130 is determined as a function of a support ratio=support length÷hinge length. For FIG. 5, the support ratio=X÷Y. It is preferred that the support ratio be in a range of about 1–3. It is more preferred that the support ratio be in a range of 2.4 to 2.8. It is most preferred that the support ratio be about 2.6.

In other embodiments, load bearing arms may be configured outside this range, and indeed may be configured so that anchor portions and bearing portions are not rigidly attached to one another, but instead articulate with respect to each other. In still other embodiments, support arms are configured as simple beams having ground engaging supports in the extended position. Although a two swing arm carriage 100 is preferred, fewer or more arms are also contemplated in alternative embodiments. Also, arms 130, 140 may be configured to engage a slot in outer wall 46 instead of floor 50. Alternatively, rollers or wheels may be used in place of slide blocks 180, 190.

Preferrably, expandable section 40 is illustrated as a relatively rigid room with side walls 42, 44, outer wall 46, roof 48, and floor 50 all rigidly coupled together in relation to one another to form a telescoping section slidingly coupled to fixed section 20. This configuration of expandable section 40 permits continuous occupancy whether in the expanded or unexpanded position. In alternative embodiments, fewer or less walls may be used and the floor or roof may not be coupled to the walls. Instead, the floor, roof, and walls may be separately extendable or movable in relation to the rest of the expandable section. In addition, the walls, floor, or roof may be foldable or pivotable in relation to the rest of the expandable section in alternative embodiments. Also, expandable section 40 may be configured to emerge from the rear of a vehicle as well as from the side.

Figure 6:
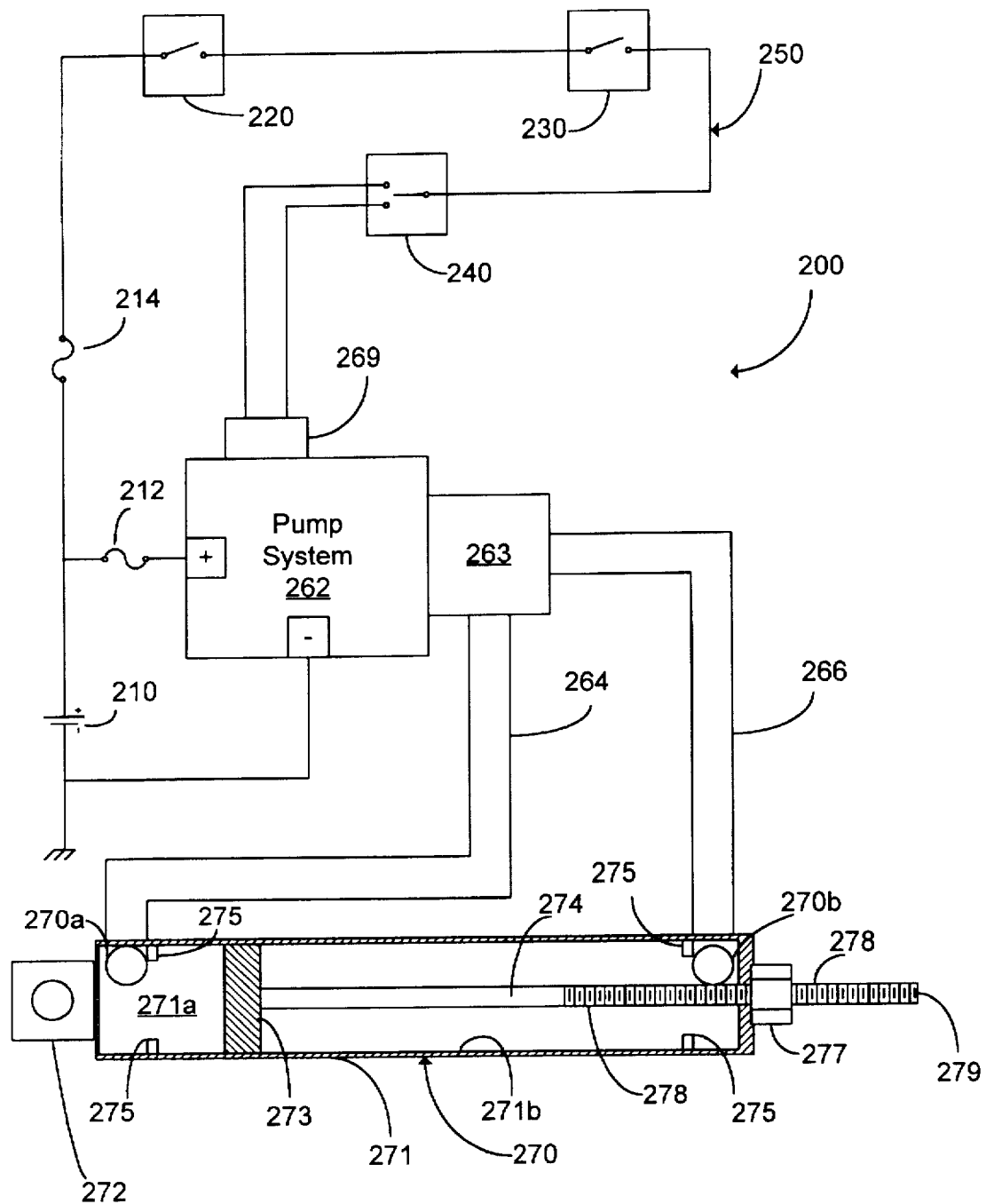
FIG. 6 is a partial diagrammatic depiction of an actuation system of one preferred embodiment of the present invention.

FIG. 6 illustrates an alternative actuation system 200 for use with carriage 100 of the present invention. Carriage control system 200 includes a controllable hydraulic pump system 262 including a controllable valve portion 263 and a control signal portion 269. Pump system 262 is selectively powered by vehicle electrical battery 210 by coupling to the depicted ± terminals with a safety fuse 212 interposed on the positive voltage side. Battery 210 and pump system 262 are of a conventional design. Controllable valve portion 263 is coupled to hydraulic actuator 270 by conduits 264 and 266.

Control circuit 250 is coupled to the positive side of battery 210 via fuse 214. Control circuit 250 comprises a number of switches 220, 230, 240 coupled in series between fuse 214 and control signal portion 269. Control switch 240 is a multiposition, multipole switch for controlling activation of pump system 262 which correspondingly controls actuation of hydraulic actuator 270. Preferably, control switch 240 is of a spring-loaded rocker design which has two active positions and a "center off" position. In order for control switch 240 to send the appropriate control signals to pump system 262, switches 220 and 230 must be closed so that current can flow through circuit 250 to control switch 240.

Switches 220 and 230 are both saftey switches to prevent inadvertent or unauthorized use of system 200. Key lock switch 220 is provided to prevent unathorized actuation, and is preferably a single pole, single throw switch which requires a key to operate. Emergency brake switch 230 is coupled to an emergency brake (not shown) for vehicle 10 either mechanically or electrically and is preferably configured as a single pole, single throw switch which is only closed if the emergency brake is set. As a result both safety switches 220 and 230 must be electrically closed by using the appropriate key and setting the emergency brake, respectively, before pump system 262 may be activated.

In a schematic cross-sectional view, hydraulic actuator 270 has a body 271 defining chambers 271a and 271b separated by piston 273 which is connected to plunger 274. Body 271 has a mounting ear 272 and plunger 274 has threads 278 up to the mounting end 279 outside of body 271. Threads 278 on mounting end 279 may be engaged to couple plunger 274 to a carriage swing arm or other mechanism requiring actuation, using conventional methods. Nut 277 is also configured to engage threads 278 along the length of plunger 274. Body 271 defines openings 270a, 270b for corresponding connection to conduits 264, 266 from pump system 262. Hydraulic actuator 270 also includes stops 275 to limit travel of piston 273 so that outlets 270a, 270b are not blocked.

The function of actuation system 200 is next discussed. Safety key lock switch 220 and emergency brake switch 230 of control circuit 250 must be closed to activate actuation system 200. Once switches 220 and 230 are closed, control switch 240 is able to selectively actuate actuator 270 via pump system 262. In one position control switch 240 sends a signal to pump system 262 which causes system 262 to supply pressurized hydraulic fluid into chamber 271a through conduit 264 and outlet 270a. Piston 273 is correspondingly pushed away from outlet 270a and plunger 274 moves out of body 271. For this position, pump 262 is also configured to allow fluid present in chamber 271b to flow toward pump 262 through outlet 270b and conduit 266.

Control switch 240 also has a second position to reverse the direction of plunger 274 relative to the first position. The second position sends a signal to pump system 262 to cause pressurized hydraulic fluid to flow through conduit 266, outlet 270b, and into chamber 271b. The fluid in chamber 271b pushes against piston 273 to cause plunger 274 to retract into body 271.

For one preferred embodiment, the amount of retraction or extension of plunger 274 with respect to body 271 is controlled by the amount of time control switch 240 is engaged in either the first or second position and the stroke of plunger 274 within body 271. Stoppers 275 limit the stroke or travel length of plunger 274 to prevent blockage of outlets 270a, 270b. Control switch 240 is also configured with an off position which maintains the plunger 274 in a selected position. Preferrably, pump system 262 is able to detect if a stroke limit has been reached and take appropriate action to prevent damage to system 200.

Besides stoppers 275, additional stroke length adjustment is provided by nut 277 when threaded on plunger 274. Nut 277 may be selectively positioned along plunger 274 by turning nut 277 about the longitudinal axis of plunger 274. Adjustment of nut 277 therealong provides further limiting of the degree of retraction of plunger 274 into body 271. Using a hydraulic actuator 270 configured in this manner as a substitute for hydraulic cylinder 170 in carriage 100, the nut 177 may be utilized to fine tune for tolerances of the carriage structure. As a result, stresses which are caused by "overretraction" of a plunger can be avoided. Avoidance of such stresses on carriage members further enhances the ability to avoid binding.

In an alternative embodiment, an electromechanical actuator is envisioned instead of a linear hydraulic actuator like 270. In another alternative embodiment two single acting hydraulic cylinders are used in place of a double acting hydraulic actuator. In this configuration, each single acting cylinder operates in a direction reverse to the other. In a variation of this configuration, each cylinder is coupled to a different load bearing arm in a swing arm configuration similar to carriage 100. In still another embodiment, an operator powered system is envisioned using a foot pump or hand crank.

Pump system 262 may additionally be used to actuate other hydraulic systems for the vehicle. Also, instead of control circuit 250, system 200 may be modified to interface with a microprocessor based system in a conventional manner.

Figure 8:
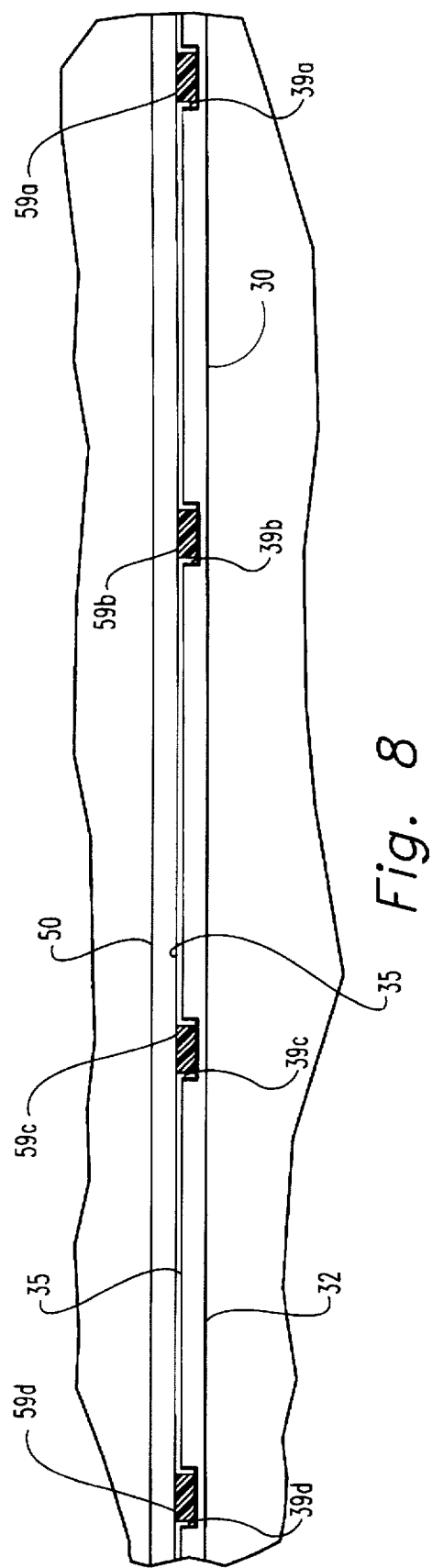
FIG. 8 is a partial side sectional view of the floor system shown in FIG. 7.

Referring to FIGS. 5, 7, and 8, another aspect of the present invention is shown. Floor 50 of expandable section 40 includes guide rails 59a–59d which are generally parallel to the direction of travel of expanded section 40 along axis T. These rails are preferably made from a self-lubricating polymeric resin. In one preferred embodiment, the rail material includes nylon.

Each guide rail slides in a corresponding guide slot 39a–39d. Slots 39a–39d are defined by a support surface 35 of a raised floor portion 32 of floor 30. An outer edge 34 of raised floor portion 32 is shown in phantom in FIG. 7. Edge 34 is generally flush with external wall 24. Each guide slot 39a–39d also is generally parallel with axis T. In alternative embodiments, at least a portion of each guide rail 39a–39d may include a self-lubricating polymeric resin—such as nylon—either as an alternative to the composition of rails 59a–59d from a self-lubricating polymeric resin or in addition to rails 59a–59d being made from a self-lubricating polymeric resin.

Rails 59a–59d slide along guide slots 39a–39d as expandable section 40 is moved relative to fixed section 20. The rails 59a–59d provide a simple alternative to rollers or wheels common to existing systems, but at the same time, the self-lubricating properties of the rail/slot configuration sacrifices little in terms of performance. Generally, this rail/slot arrangement enhances non binding travel of expandable section 40.

In other embodiments, more or less rails in corresponding slots are envisioned. Also, the fixed portion may have one or more rails in corresponding slots defined by the movable floor. The rail/slot arrangement of the present invention may also be used independent of the type of expansion system or expandable portion configuration. Furthermore, other embodiments of the present invention may not employ the guide rail/slot configuration feature.

Next referring to FIGS. 9–12, a coupling latch 300 of the present invention is shown. The coupling latch 300 has a member 310 with opposite sides 312, 314 and opposing ends 316, 318. Member 310 has a top surface 326 opposite a bottom surface 328. Side 314 defines a notch 330 with interface 332. Member 310 also has guide shoulder 321, 322, 323, and 324.

Member 350 includes guide rails 352, 354 opposing each other. Guide rails 352, 354 define a channel 356 therebetween. Channel 356 has an entry end 357 and terminal end 359. Terminal end 359 is bounded by header 360 configured with shoulder sides 361, 362. Member 350 has a top surface 366 opposite a bottom surface 368. Rail 354 defines a notch 370 intersecting channel 356. Notch 370 has a floor 372.

Figure 9:
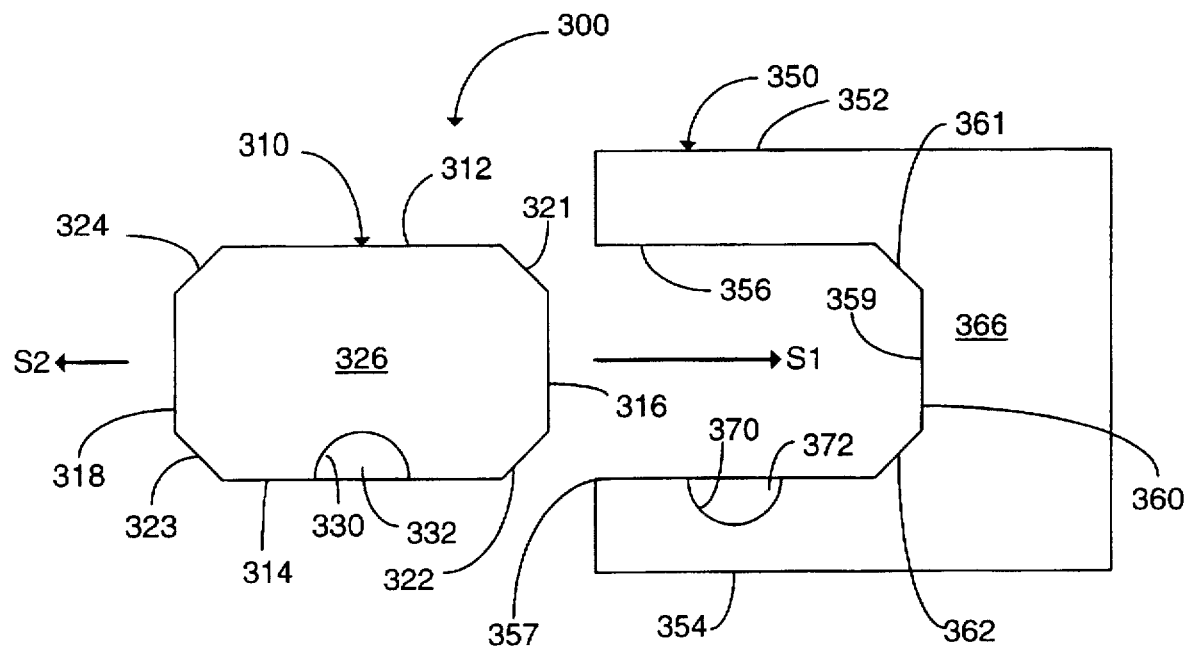
FIG. 9 is a top view of a coupling latch of another preferred embodiment of the present invention.
Figure 10:
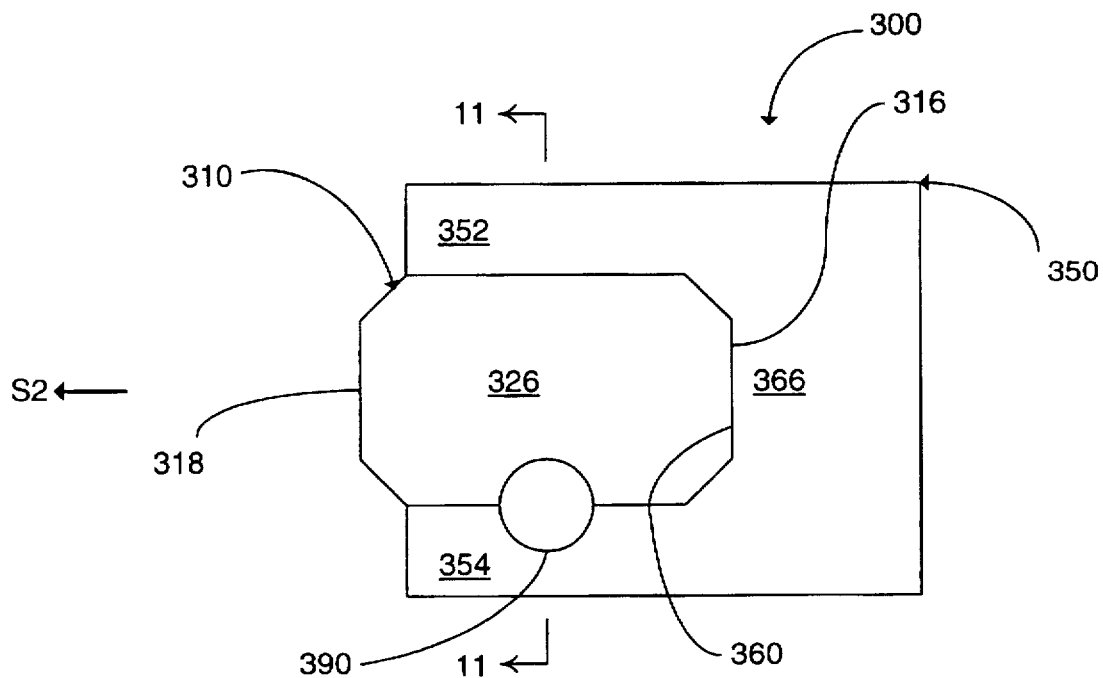
FIG. 10 is a top view of the embodiment shown in FIG. 9.

Referring to FIG. 9, operation of coupling latch 300 is next discussed. Member 310 moves relative to member 350. Member 310 is configured to slide between guide rails 352, 354 and into channel 356 along arrow S1. Preferably, member 310 is configured to fit snugly between rails 352, 354. Movement along arrow S1 is stopped by header 360 when end 316 reaches terminal end 359 as shown in FIG. 10. Notably, shoulders 321, 322 help to guide end 316 of member 310 into entry end 357 of channel 356.

Figure 11:
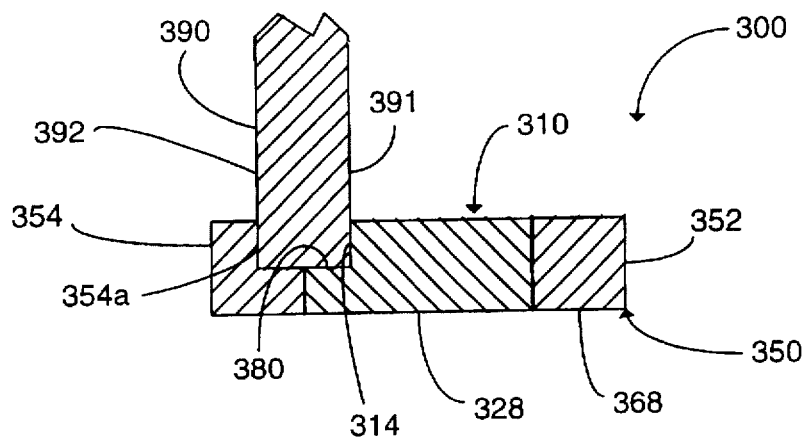
FIG. 11 is a cross-sectional view of the embodiment shown in FIG. 9 taken along section line 11—11 of FIG. 10.
Figure 12:
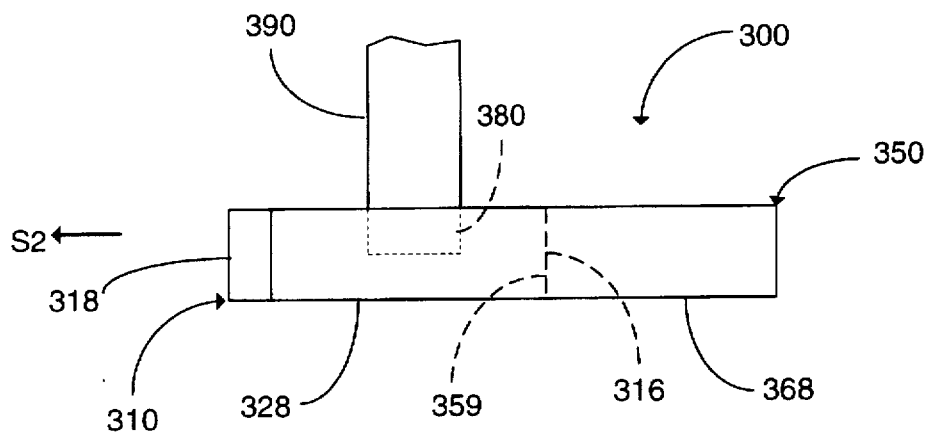
FIG. 12 is an elevational side view of the embodiment shown in FIG. 9.

When end 316 meets header 360, notch 330 aligns with notch 370 to form cavity 380 as shown in FIGS. 10 and 12. FIGS. 10–12 also show a coupling pin 390 inserted into cavity 380. Pin 390 snugly fits into cavity 380 to prevent substantial movement of member 310 relative to member 350 along any plane parallel to the view plane of FIG. 10. Member 310 cannot be moved along directional arrow S2 without breaking or deforming at least one of members 310, 350, and pin 390.

Referring to FIG. 11, coupling pin 390 is shown with opposing sides 391, 392. Notably, when engaged in cavity 380, side 391 contacts side 354a of guide rail 354 and side 392 contacts side 314 of member 310.

As illustrated, members 310, 350 are configured as substantially planar plates; however, in other embodiments, one of more of the structures designated by reference numerals 310, 350, and 390 may be shaped differently as would occur to one skilled in the art. For example, member 350 need not have a header 360 to facilitate alignment of notches 330 and 370. Also, some embodiments do not have shoulders 321, 322, 323, and 324, or these shoulders are shaped differently. In addition, interface 332, floor 372, or both may be absent. In an embodiment having neither interface 332 nor floor 372, chamber 370 becomes a bore so that coupling pin 390 may completely pass through members 310 and 350 during latching. However, even without interface 332, and floor 372, pin 390 need not pass completely through either member 310 or member 350 to substantially prevent movement of member 310 relative to member 350. As a result, coupling latch 300 provides a way to interlock two bodies together that are movable in relation to each other without needing to align holes for the passage of a coupling pin therethrough.

Members 310, 350 can each be mounted on walls or other surfaces movable in relation to each other to provide for selective coupling with pin 390. Similarly, either member may be defined or formed from a continuous surface.

FIGS. 13–16 illustrate a coupling system for an enclosure using a coupling latch of the present invention. Housing system 400 includes walls 401 and 402 movable relative to each other along axis M. Generally walls 401 and 402 are parallel to each other, and move along a plane parallel to axis M. In one embodiment, walls 401 and 402 are part of a vehicular enclosure having an expandable portion and a fixed portion.

Figure 13:
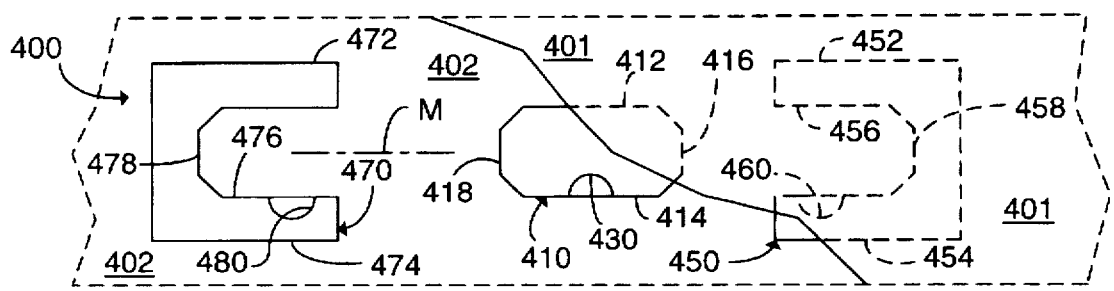
FIG. 13 is a cutaway side view of a coupling system of yet another preferred embodiment of the present invention.

FIG. 13 shows a cutaway side view of coupling members 450 and 470 extending from wall 402. Coupling finger 410 projects from wall 401 and is selectively movable between coupling members 450, 470 along axis M as wall 401 moves relative wall 402. Coupling finger 410 has opposite ends 416, 418 and opposite sides 412, 414. Side 414 defines a notch 430. Coupling member 450 has opposing guide rails 452, 454 defining channel 456 therebetween. Channel 456 terminates at header 458. Guide rail 454 defines notch 460 intersecting channel 456. Coupling member 470 has opposing guide rails 472, 474 defining channel 476 therebetween. Channel 476 terminates at header 478. Guide rail 474 defines notch 480 intersecting channel 476. The illustration of FIG. 13 contemplates finger 410 and members 450, 470 as separate bodies that are attached to walls 401, 402 using conventional methods; as intergral unitary portions or formations of walls 401, 402 defined by the respective wall surfaces; or a combination of these depictions.

Figure 14:
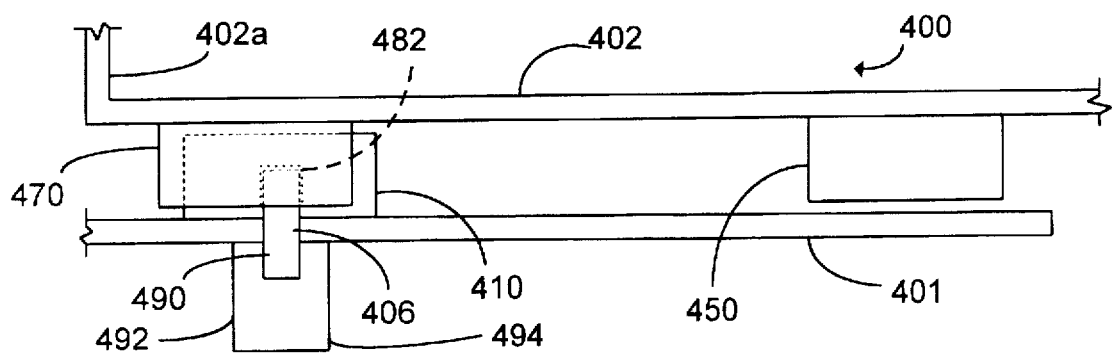
FIG. 14 is a diagrammatic top view of one state of operation of the embodiment shown in FIG. 13.
Figure 15:
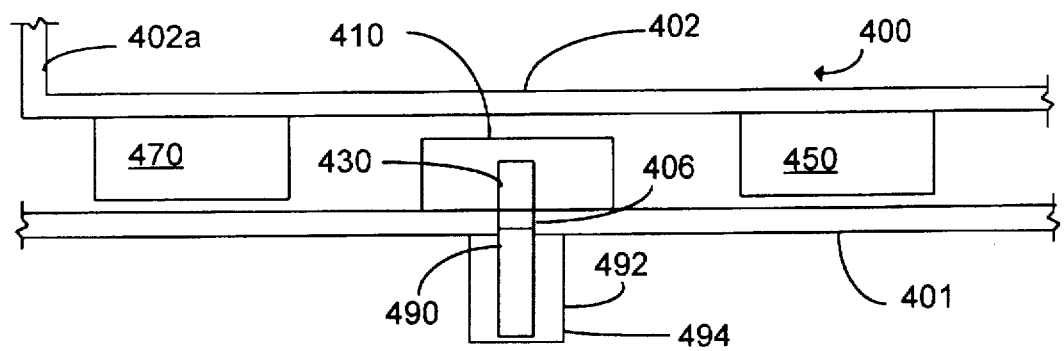
FIG. 15 is a diagrammatic top view of the embodiment of FIG. 13 in a different state of operation.
Figure 16:
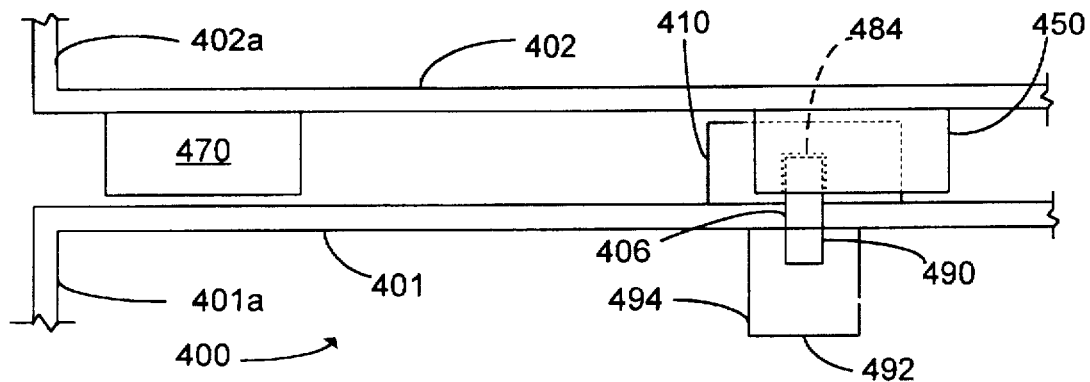
FIG. 16 is a diagrammatic top view of the embodiment of FIG. 13 in yet another state of operation.

FIGS. 14–16 are parital top sectional views of the embodiment shown in FIG. 13 with walls 401 and 402 in different relative positions. In FIG. 14, coupling finger 410 is illustrated as a projection from wall 401 and is shown engaged in channel 476 so that notches 430 and 480 align to form chamber 482. Chamber 482 aligns with aperture 406 defined by wall 401. In addition, coupling pin 490 is shown coupled to controllable actuator 492. Actuator 492 is attached to wall 401 opposite finger 410 so that coupling pin 490 may pass through aperture 406. Activation of actuator 492 causes coupling pin 490 to pass through aperture 406 and engage chamber 482. When engaged in chamber 482, pin 490 prevents separation of finger 410 from coupling member 470 in a manner descibed for coupling latch 300. Wall 401 extends past corner wall 402a which may correspond to the extended position of expandable section 40 such as shown in FIG. 1.

FIG. 15 shows an intermediate position of finger 410 between coupling members 450 and 470. This position of finger 410 corresponds to movement of walls 401 and 402 relative to one another between coupling positions. Coupling pin 490 is disengaged from coupling member 470 and is retracted into housing 494 of actuator 492.

FIG. 16 shows another coupling position of walls 401 and 402 corresponding to engagement of finger 410 in channel 456 of couping member 450. When finger end 416 meets header 458, notch 430 is aligned with notch 460 to form chamber 484. Coupling pin 490 is engaged in chamber 484 to interlock coupling member 450 and finger 410 together, preventing substantial movement of walls 401, 402 relative to each other. Corner walls 402a, 401a are generally aligned which may correspond to the unextended postion of expandable section 40 shown in FIG. 2.

In another embodiment, wall 402 is configured to define a channel with appropriately spaced intersecting side notches as a substitute for members 450, 470. For a substantially planar wall as shown in FIGS. 13–16, the notched channel of this configuration would generally lie below the plane of the wall surface.

Acuator 492 may be a solenoid or hydraulically controlled device of a conventional type. Preferrably, actuator 492 holds pin 490 in engagement with chamber 482 even when the power source for the actuator fails. In other embodiments, actuator 492 is a spring-loaded faster operated manually or another type of actuator conventionally used to direct linear motion of a body. It is also preferred that actuator 492 be coupled to a control system which prevents inadvertant release of coupling pin 490 from chamber 482 when such release can adversely impact safety. One example is the application of the system shown in FIGS. 13–16 to provide for selective coupling of an expandable portion of a vehicle in expanded and unexpanded states.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for varying space in a vehicle, comprising:

a fixed portion having occupiable space;

a number of ground engaging wheels coupled to said fixed portion;

An expandable portion coupled to said fixed portion, said expandable portion having a rigid floor, said expandable portion being movable relative to said fixed portion to adjust volume of a living space defined by said fixed and expandable portions, said floor being configured for planar movement along a generally horizontal plane when said expandable portion is moved;

a first load bearing arm engaging said floor to support said expandable portion, said first load bearing arm being pivotally anchored to said fixed portion to rotate about a generally vertical first axis to correspondingly move said expandable portion; and an operator controlled actuator coupled to said first load bearing arm to selectively rotate said first load bearing arm and thereby control position of said expandable portion relative to said fixed portion to provide adjustment of said living space;

wherein said first load bearing arm has an oblique portion for coordinating rotation of said first load bearing arm.

2. The system of claim 1, further comprising an expandable roof to provide a ceiling for said expandable portion.

3. The system of claim 2, wherein said first load bearing arm is coupled to said roof.

4. The system of claim 1, wherein said floor is coupled to said first load bearing arm.

5. The system of claim 1, wherein said expandable portion includes a window.

6. The system of claim 1, wherein said first load bearing arm engages a slot defined by said expandable portion and said slot is oriented along a generally horizontal axis.

7. A system for varying space in a vehicle, comprising:

a fixed portion having occupiable space;

a number of ground engaging wheels coupled to said fixed portion;

An expandable portion coupled to said fixed portion, said expandable portion having a rigid floor, said expandable portion being movable relative to said fixed portion to adjust volume of a living space defined by said fixed and expandable portions, said floor being configured for planar movement along a generally horizontal plane when said expandable portion is moved;

a first load bearing arm engaging said floor to support said expandable portion, said first load bearing arm being pivotally anchored to said fixed portion to rotate about a generally vertical first axis to correspondingly move said expandable portion;

an operator controlled actuator coupled to said first load bearing arm to selectively rotate said first load bearing arm and thereby control position of said expandable portion relative to said fixed portion to provide adjustment of said living space;

a second load bearing arm engaging said floor to support said expandable portion, said second load bearing arm being pivotally anchored to said fixed portion to rotate about a generally vertical second axis to correspondingly move said expandable portion; and a rod movably coupled to said first and second load bearing arms and spanning a distance therebetween, said rod being configured to rotate said first and second load bearing arms in tandem.

8. The system of claim 7, wherein:

said expandable portion moves relative to said fixed portion along a third axis, said third axis being generally horizontal;

said expandable portion includes an outer wall joining a pair of opposing walls and a roof, said outer wall being rigidly attached to said floor;

said expandable portion includes a window;

each of said first and second load bearing arms has an anchor portion for pivotal attachment to said fixed portion and a bearing portion opposite said anchor portion and rigidly connected to said anchor portion;

said bearing portion of each of said first and second load bearing arms is coupled to said floor by engagement of a slot defined by said expandable portion and said slot is oriented along a fourth axis, said fourth axis is generally horizontal and generally perpendicular to said first, second, and third axes; and said actuator includes a hydraulic cylinder pivotally attached to said fixed portion and said first load bearing arm, an electrically powered hydraulic pump coupled to said hydraulic cylinder, and a control switch coupled to said electrically powered hydraulic pump.

9. A system for varying space in a vehicle, comprising:

a fixed portion having occupiable space;

a number of around engaging wheels coupled to said fixed portion;

An expandable portion coupled to said fixed portion, said expandable portion having a rigid floor, said expandable portion being movable relative to said fixed portion to adjust volume of a living space defined by said fixed and expandable portions, said floor being configured for planar movement along a generally horizontal plane when said expandable portion is moved;

a first load bearing arm engaging said floor to support said expandable portion, said first load bearing arm being pivotally anchored to said fixed portion to rotate about a generally vertical first axis to correspondingly move said expandable portion; and an operator controlled actuator coupled to said first load bearing arm to selectively rotate said first load bearing arm and thereby control position of said expandable portion relative to said fixed portion to provide adjustment of said living space;

wherein said first load bearing arm has a support ratio in the range of 1 to 3.

10. The system of claim 9, wherein said support ratio is in the range of about 2.4 to 2.8.

11. The system of claim 9, wherein said support ratio is about 2.6.

12. A system for adjustably sizing space inside a vehicle, comprising:

a fixed section with occupiable space;

a number of ground engaging wheels coupled to said fixed section;

a telescoping section being at least partially nested within said fixed section, said telescoping section being movable relative to said fixed section along a first axis to vary volume of a living space defined by said fixed and telescoping sections;

a first load bearing arm to support and position said telescoping section relative to said fixed section, having:

an anchor portion pivotally connected to said fixed portion, said first load bearing arm being configured to rotate about a second axis generally perpendicular to said first axis, a bearing portion opposite said anchor portion and rigidly connected thereto, said bearing portion engaging said telescoping section to supportably move said telescoping section as said first load bearing arm rotates; and an operator controlled actuator coupled to said first load bearing arm to selectively rotate said first load bearing arm about said second axis and thereby control position of said telescoping section relative to said fixed sections;

wherein said first load bearing arm has a support ratio in the range of 1 to 3.

13. The system of claim 12, said telescoping section includes a pair of opposing walls, a roof, and a floor joined to an outer wall, and said telescoping section includes a window.

14. The system of claim 12, wherein said bearing portion is coupled to said telescoping section by engagement of a slot defined by said telescoping section, said slot is oriented along a third axis, and said third axis is generally perpendicular to said first and second axes.

15. The system of claim 12, wherein said support ratio is in the range of about 2.4 to 2.8.

16. The system of claim 12, wherein said support ratio is about 2.6.

17. The system of claim 12, further comprising:

a second load bearing arm engaging said floor to support said telescoping section, said second load bearing arm being pivotally anchored to said fixed section to rotate about a third axis generally perpendicular to said first axis; and a rod movably coupled to said first and second load bearing arms and spanning a distance therebetween, said rod being configured to rotate said first and second load bearing arms in tandem.

18. The system of claim 12, wherein said fixed section includes an anchor bracket configured for pivotal attachment to said first load bearing arm.

19. A vehicle for providing adjustable occupant space, comprising:

a fixed section;

a number of ground engaging wheels coupled to said fixed section;

an expandable section movable relative to said fixed section to vary volume of a living space defined by said fixed and expandable sections;

a carriage for supporting said expandable section and moving said expandable section relative to said fixed section, including:

a pair of load bearing arms, each of said pair of arms having:

a first portion pivotally attached to said fixed section, each of said pair of arms being configured to rotate about a generally vertical axis, a second portion opposite said first portion and engaging said expandable section, a rod movably coupled to said first portion of each of said pair of arms and spanning a distance therebetween, said rod being configured to rotate said pair of arms in tandem; and an operator controlled actuator coupled to said carriage, said actuator selectively rotating said pair of arms to control position of said expandable section relative to said fixed section and thereby adjust said living space.

20. The vehicle of claim 19, wherein said expandable section includes a storage compartment configured for access from outside said living space and positioned between said pair of arms.

21. The vehicle of claim 19, wherein said expandable section includes a pair of opposing walls, a roof and a floor joined to an outer wall, and said expandable section is configured for telescoping movement relative to said fixed section.

22. The vehicle of claim 19, wherein said second portion of each of said pair of arms is coupled to said expandable section by engagement of a slot defined by said expandable portion.

23. The vehicle of claim 19, wherein each of said pair of arms has an oblique portion pivotally connected to said rod.

24. The vehicle of claim 19, wherein said actuator includes a hydraulic cylinder pivotally attached to said fixed portion and one of said load bearing arms, an electrically powered hydraulic pump coupled to said hydraulic cylinder, and a control switch coupled to said electrically powered hydraulic pump.

25. The vehicle of claim 19, wherein said rod includes a turnbuckle.

26. A vehicle for providing adjustable occupant space, comprising:

a fixed section with a number of ground engaging wheels;

an expandable section coupled to said fixed section, at least a portion of said expandable section being movable into and out of said fixed section to correspondingly vary volume of a living space defined by said fixed and expandable sections, said expandable section having a floor which remains generally rigid when said expandable section is moved relative to said fixed section;

a pair of load bearing arms each having:

a first portion pivotally attached to said fixed section;

a second portion opposite said first portion and engaging said expandable section; and an operator controlled actuator coupled to said arms, said actuator selectively rotating each of said pair of arms in the same rotational direction to control position of said expandable section relative to said fixed section and thereby adjust said living space.

27. The system of claim 26, further comprising a rod movably coupled to said first portion of each of said pair of arms and spanning a distance therebetween, said rod being configured to rotate said pair of arms in tandem.

28. The system of claim 26, wherein each of said pair of arms has a support ratio in a range of about 1 to 3.

29. The system of claim 26, wherein one of said arms has an oblique portion for coordinating rotation of said arms.

30. A vehicle for providing adjustable occupant space, comprising:

a fixed section with a number of ground engaging wheels;

an expandable section coupled to said fixed section, at least a portion of said expandable section being telescopically movable into and out of said fixed section to correspondingly vary volume of a living space defined by said fixed and expandable sections;

a first load bearing arm having a first anchor portion mounted to said fixed section to pivot about a first rotational axis and a first bearing portion engaging said expandable section;

a second load bearing arm having a second anchor portion mounted to said fixed section to pivot about a second rotational axis and a second bearing portion engaging said expandable section; and an operator controlled actuator coupled to said arms to selectively rotate said arms and control position of said expandable section relative to said fixed section to thereby adjust said living space;

wherein position of said first rotational axis relative to said second rotational axis remains generally fixed as said expandable section is moved relative to said fixed section.

31. The system of claim 30, further comprising a rod movably coupled to said first portion of each of said pair of arms and spanning a distance therebetween, said rod being configured to rotate said pair of arms in tandem.

32. The system of claim 30, wherein each of said pair of arms has a support ratio in a range of about 1 to 3.

33. The system of claim 30, wherein one of said arms has an oblique portion for coordinating rotation of said arms.

34. The system of claim 30, wherein said actuator rotates said first arm in the same rotational direction as said second arm when said expandable portion is moved relative to said fixed section.

* * * * *

UNITED STATES PATENT AND TRADEMARK OFFICE
CERTIFICATE OF CORRECTION

PATENT NO. : 5,800,002
DATED : September 1, 1998
INVENTOR(S) : R. Tiedge et al.

It is certified that error appears in the above-identified patent and that said Letters Patent is hereby corrected as shown below:

COLUMN      LINE

15      36      "sections;" should read --section;--
(Claim 12,   lines 27-28)

Signed and Sealed this

Twentieth Day of July, 1999

Attest:

Q. TODD DICKINSON

Attesting Officer      Acting Commissioner of Patents and Trademarks